(12) United States Patent
Kitamoto

(10) Patent No.: US 9,831,807 B2
(45) Date of Patent: Nov. 28, 2017

(54) MOTOR CONTROL APPARATUS AND POWER STEERING SYSTEM

(71) Applicant: JTEKT CORPORATION, Osaka-shi, Osaka (JP)

(72) Inventor: Hiroshi Kitamoto, Toyota (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/420,669

(22) Filed: Jan. 31, 2017

(65) Prior Publication Data

US 2017/0229983 A1   Aug. 10, 2017

(30) Foreign Application Priority Data

Feb. 4, 2016   (JP) .................... 2016-020067

(51) Int. Cl.

| | |
|---|---|
| *H02P 27/04* | (2016.01) |
| *H02P 6/14* | (2016.01) |
| *B62D 5/04* | (2006.01) |
| *H02P 6/12* | (2006.01) |
| *H02P 29/00* | (2016.01) |

(Continued)

(52) U.S. Cl.
CPC .............. *H02P 6/14* (2013.01); *B62D 5/046* (2013.01); *B62D 5/0487* (2013.01); *H02M 1/08* (2013.01); *H02P 6/12* (2013.01); *H02P 29/00* (2013.01); *H03K 17/063* (2013.01); *B62D 5/0484* (2013.01)

(58) Field of Classification Search
CPC .... H02P 6/14; H02P 6/12; H02P 27/04; H02P 27/06; H02P 3/00; H02P 5/00; H02P 6/00; H02P 23/00; H02P 25/00
USPC ...... 318/400.01, 400.02, 400.14, 400.3, 700, 318/701, 727, 779, 799, 800, 801, 805, 318/400.26, 400.27; 363/40, 44, 95, 120, 363/174, 175; 323/231, 345
See application file for complete search history.

(56) References Cited

U.S. PATENT DOCUMENTS

| | | | |
|---|---|---|---|
| 7,557,637 B2 * | 7/2009 | Sakamoto | ............ H03K 17/063 327/109 |
| 2014/0200767 A1 | 7/2014 | Mikamo et al. | |

FOREIGN PATENT DOCUMENTS

| | | |
|---|---|---|
| DE | 10 2007 009885 A1 | 10/2007 |
| EP | 2754601 A1 | 7/2014 |

(Continued)

OTHER PUBLICATIONS

Jun. 29, 2017 Extended Search Report issued in European Patent Application No. 17154037.0.

*Primary Examiner* — Antony M Paul
(74) *Attorney, Agent, or Firm* — Oliff PLC

(57) ABSTRACT

A motor control apparatus includes an inverter, a driver, a negative voltage circuit, a voltage dividing circuit, and a detection unit. The inverter includes an upper-arm switching element and a lower-arm switching element to supply a voltage of a node between the upper-arm switching element and the lower-arm switching element to a motor as a phase voltage. The driver applies a first voltage or a second voltage to the upper-arm switching element to control and turn the upper-arm switching element on and off. The negative voltage circuit supplies a voltage lower than the voltage of the node to the driver as the second voltage. The voltage dividing circuit performs voltage division between the negative voltage circuit and a negative power supply. The detection unit outputs a signal based on a voltage resulting from the voltage division by the voltage dividing circuit.

8 Claims, 9 Drawing Sheets

(51) Int. Cl.
     *H02M 1/08*     (2006.01)
     *H03K 17/06*    (2006.01)

(56)         References Cited

FOREIGN PATENT DOCUMENTS

JP      2011-229011  A     11/2011
JP      2014-135866  A      7/2014

* cited by examiner

MOTOR CONTROL APPARATUS AND POWER STEERING SYSTEM

INCORPORATION BY REFERENCE

The disclosure of Japanese Patent Application No. 2016-020067 filed on Feb. 4, 2016 including the specification, drawings and abstract, is incorporated herein by reference in its entirety.

BACKGROUND OF THE INVENTION

1. Field of the Invention

The invention relates to a motor control apparatus that drives a motor and a power steering system using the motor control apparatus.

2. Description of the Related Art

In a power steering system, rotation of a motor is transmitted to a steering shaft to assist steering. To control such a motor, an inverter and drivers for the inverter are used. The inverter includes a bridge circuit with a plurality of sets of an upper arm and a lower arm connected together in series between a positive electrode and a negative electrode of a DC power supply. A middle point between the upper arm and the lower arm in the inverter is connected to each phase coil of the motor. The upper arm and the lower arm are composed of switching elements. The drivers control and turn the switching elements on and off in accordance with control signals. Operations of turning the switching elements on and off allow phase voltages to be supplied to the respective phase coils of the motor, and the motor is thus rotated.

In a conventional circuit configuration, voltage sensors that detect a voltage are each provided at the middle point between the upper arm and the lower arm in order to monitor the corresponding phase voltages of the motor. For example, see Japanese Patent Application Publication No. 2014-135866 (JP 2014-135866 A).

The drivers control and turn the switching elements in the inverter on and off by selectively supplying a predetermined first voltage and a second voltage lower than the first voltage to the switching elements. The second voltage, which is lower than the first voltage, may be based, for example, on a negative voltage lower than a ground voltage. Consequently, the second voltage can be made lower than the first voltage, enabling, for example, enhancement of switching characteristics and the use of normally-on transistors as the switching elements.

As described above, when the negative voltage is used to control the switching elements, it is preferable to monitor a circuit supplying the negative voltage. However, when a sensor configured to monitor the circuit supplying the negative voltage is added besides the voltage sensors detecting the phase voltages, the configuration of the motor control apparatus is complicated.

SUMMARY OF THE INVENTION

An object of the present application is to provide a motor control apparatus that uses a simple configuration to enable monitoring of a circuit supplying a negative voltage used to control switching elements, and a power steering system using the motor control apparatus.

A motor control apparatus in an aspect of the invention includes an inverter, a driver, a negative voltage circuit, a voltage dividing circuit, and a detection unit. The inverter includes an upper-arm switching element and a lower-arm switching element connected together in series between a positive electrode and a negative electrode of a DC power supply to supply a voltage of a node between the upper-arm switching element and the lower-arm switching element to a motor as a phase voltage. The driver controls and turns the upper-arm switching element on and off by applying a first voltage or a second voltage lower than the first voltage to the upper-arm switching element in accordance with a control signal. The negative voltage circuit is connected between the node between the upper-arm switching element and the lower-arm switching element and a negative power supply supplying a negative voltage lower than a ground voltage, and supplies, based on the voltage of the node, a voltage lower than the voltage of the node to the driver as the second voltage. The voltage dividing circuit is arranged between the negative voltage circuit and the negative power supply to perform voltage division between the negative voltage circuit and the negative power supply. The detection unit outputs a signal based on a voltage resulting from the voltage division by the voltage dividing circuit.

The present disclosure uses the simple configuration to enable monitoring of the circuit supplying the negative voltage used to control the switching elements.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
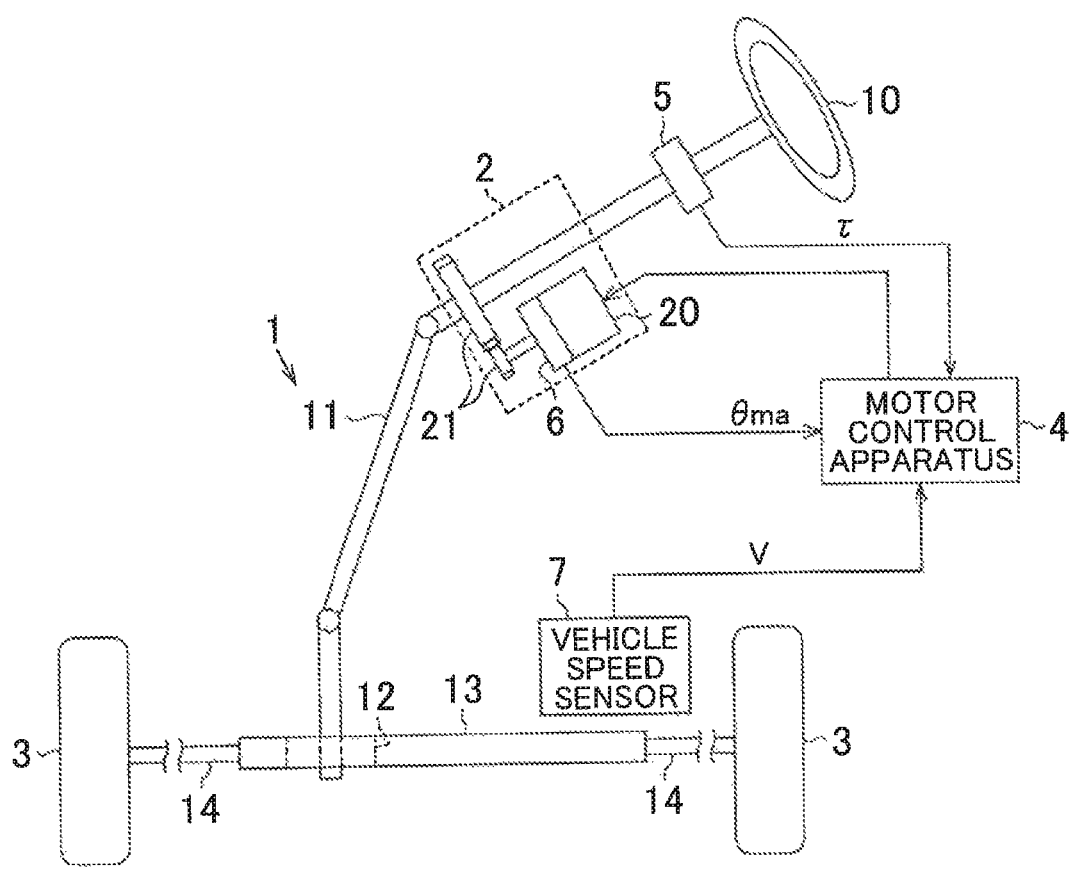
FIG. 1 is a block diagram depicting a configuration example of a power steering system.

A motor control apparatus in an aspect of the invention includes an inverter, a driver, a negative voltage circuit, a voltage dividing circuit, and a detection unit. The inverter includes an upper-arm switching element and a lower-arm switching element connected together in series between a positive electrode and a negative electrode of a DC power supply, and supplies a voltage of a node between the upper-arm switching element and the corresponding lower-arm switching element to a motor as a phase voltage. The driver controls and turns the upper-arm switching element on and off by applying a first voltage or a second voltage lower than the first voltage to the upper-arm switching element in accordance with a control signal. The negative voltage circuit is connected between the node between the upper-arm switching element and the corresponding lower-arm switching element and a negative power supply supplying a negative voltage lower than a ground voltage, and supplies, based on the voltage of the node, a voltage lower than the voltage of the node to the driver as the second voltage. The voltage dividing circuit is arranged between the negative voltage circuit and the negative power supply to perform voltage division between the negative voltage circuit and the negative power supply. The detection unit outputs a signal based on a voltage resulting from the voltage division by the voltage dividing circuit.

In the above-described configuration, based on the voltage of the node between the upper-arm switching element and the lower-arm switching element, the negative voltage circuit supplies the voltage lower than the voltage of the node to the driver. The voltage supplied to the driver is used as the second voltage, which is the lower of the first and second voltages applied to the upper-arm switching element. The voltage dividing circuit performs the voltage division between the negative voltage circuit and the negative power supply to generate a voltage between a voltage supplied by the negative voltage circuit and a voltage of the negative electrode. The voltage resulting from the voltage division varies according to the voltage of the node. The detection unit outputs a signal based on the voltage resulting from the voltage division. Thus, the signal output from the detection unit has a value corresponding to the voltage of the node. The voltage of the node is a phase voltage of the motor. Thus, the signal output by the detection unit contains information on the phase voltage of the motor. The signal output by the detection unit is also affected by the negative voltage circuit and the negative power supply. For example, a failure in the negative power supply or the negative voltage circuit varies the signal output from the detection unit. As described above, the output signal from the detection unit contains information on the negative power supply and the negative voltage circuit in addition to the information on the phase voltage supplied to the motor. The output signal from the detection unit enables monitoring of the negative voltage circuit and the negative power supply in addition to monitoring of the phase voltages of the motor. In this case, it is not necessary to provide, in addition to the circuit detecting the phase voltage, a separate circuit that detects states of the negative voltage circuit and the negative power supply. Thus, the circuit supplying the negative voltage used to control the switching element can be monitored using the simple configuration.

In the above-described configuration, the detection unit detects the voltage resulting from the voltage division by the voltage dividing circuit between the negative voltage circuit and the negative power supply. A possible range of the voltage resulting from the voltage division is narrower than a possible range of the voltage supplied by the negative voltage circuit, that is, a possible range of the voltage of the node between the upper-arm switching element and the corresponding lower-arm switching element. Thus, the voltage dividing circuit enables an increase in the ranges of the voltage of the node and the voltage supplied by the negative voltage circuit, which voltages can be identified by the signal from the detection unit.

The motor control apparatus may further include an abnormality detection unit that detects abnormality in the negative voltage circuit or the negative power supply based on the signal output by the detection unit. This allows detection of abnormality in the negative voltage supplied by the negative voltage circuit or the negative power supply.

The motor control apparatus may further include a control unit that generates, using the signal output by the detection unit, a control signal that controls and turns the upper-arm switching element and the lower-arm switching element on and off to output the control signal to the driver. Consequently, the motor can be controlled and driven based on the phase voltage of the motor. For example, the control unit generates the control signal based on the phase voltage in each phase of the motor obtained from the signal output by the detection unit to enable rotation angle sensorless control to be performed. Abnormality in the motor is also detected based on the signal output by the detection unit to enable fail safe control in which the motor is stopped when abnormality is detected.

The negative voltage circuit may include a capacitor and a Zener diode connected together in parallel. This enables the supply, as the second voltage, of a voltage that is lower than the voltage of the node between the upper-arm switching element and the lower-arm switching element by the value of a Zener voltage.

The upper-arm switching element may be a normally-on transistor. This configuration allows monitoring of the circuit supplying the second voltage used to turn the normally-on upper-arm switching element off. This enables effective avoidance of a defect in which abnormality in the circuit prevents appropriate application of the second voltage, which is a negative voltage, inhibiting turn-off of the normally-on upper-arm switching element.

The detection unit may include a level shift circuit that shifts the level of the voltage resulting from the voltage division by the voltage dividing circuit. Consequently, the detection unit allows an output value to be made more appropriate.

The voltage dividing circuit may include a plurality of resistors connected together in series between the negative voltage circuit and the negative power supply. Consequently, even if any of the resistors is short-circuited, flow of an excessively large current through the negative voltage circuit can be suppressed.

Another embodiment of the invention is a power steering system that applies a steering assist force to a steering mechanism of a vehicle. The power steering system may include the motor control apparatus configured as described above and the motor controlled by the motor control apparatus to apply the steering assist force to the steering mechanism.

Embodiments will be described below with reference to the drawings. The same and corresponding components are denoted by the same reference numerals, and the same description is not repeated. For convenience of description, in each of the figures, a configuration may be simplified or a part of the configuration may be omitted.

FIG. 1 is a block diagram depicting a configuration example of the power steering system. The power steering system depicted in FIG. 1 includes a steering mechanism 1 that steers steered wheels 3 based on an operation of a steering wheel 10 by a driver, and an assist mechanism 2 that assists the driver's steering operation.

The steering mechanism 1 includes a steering shaft 11 serving as a rotating shaft of the steering wheel 10 and a rack shaft 13 coupled to a lower end of the steering shaft 11 via a rack-and-pinion mechanism 12. Tie rods 14 are coupled to opposite ends of the rack shaft 13. The steered wheels 3 are coupled to the respective tie rods 14. In the steering mechanism 1, when the steering shaft 11 rotates in conjunction with operation of the steering wheel 10 by the driver, the resultant rotary motion is converted into an axial reciprocating linear motion of the rack shaft 13 via the rack-and-pinion mechanism 12. The reciprocating linear motion of the rack shaft 13 is transmitted to the steered wheels 3 via the tie rods 14 coupled to the opposite ends of the rack shaft 13. This changes the steered angle of the steered wheels 3 and thus changes a traveling direction of the vehicle.

The assist mechanism 2 includes a motor 20 that applies an assist torque to the steering shaft 11. The motor 20 is a three-phase brushless motor. Rotation of the motor 20 is transmitted to the steering shaft 11 via a gear mechanism 21 to apply a motor torque to the steering shaft 11, allowing the steering operation to be assisted.

The power steering system is provided with various sensors that detect a manipulated variable for the steering wheel 10 and a state variable for the wheel. For example, the steering shaft 11 is provided with a torque sensor (torque detection unit) 5 that detects a torque (steering torque) $\tau$ applied to the steering shaft 11 during the driver's steering operation. The motor 20 is provided with a rotation angle sensor 6 that detects a rotation angle (electrical angle) $\theta$ma of the motor 20. The vehicle is provided with a vehicle speed sensor 7 that detects a vehicle speed (traveling speed) V of the vehicle. Outputs from the sensors 5 to 7 are loaded into the motor control apparatus 4. The motor control apparatus 4 controls and drives the motor 20 based on the outputs from the sensors 5 to 7.

Figure 2:
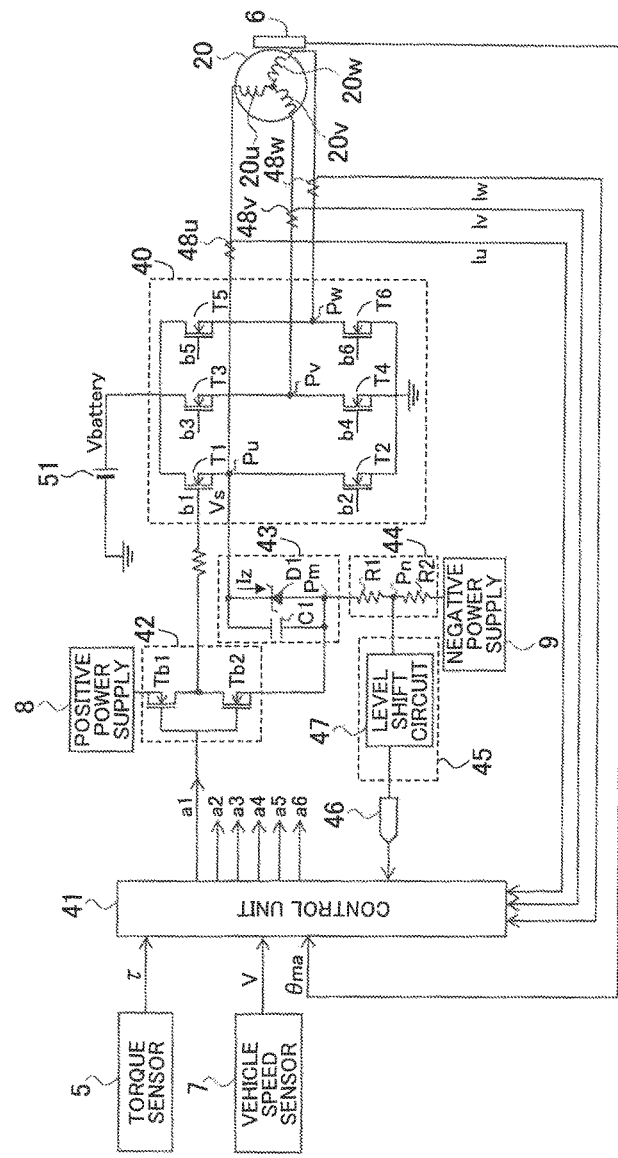
FIG. 2 is a block diagram depicting a configuration example of a motor control apparatus.

FIG. 2 is a block diagram depicting a configuration example of the motor control apparatus 4. The motor control apparatus 4 includes an inverter 40, a control unit 41, drivers represented by a driver 42, negative voltage circuits represented by a negative voltage circuit 43 corresponding to the driver 42, voltage dividing circuits represented by a voltage dividing circuit 44 corresponding to the driver 42, and detection units represented by a detection unit 45 corresponding to the driver 42.

The inverter 40 is a driving circuit that supplies a three-phase alternating voltage to the motor 20. The inverter 40 includes upper-arm switching elements T1, T3, T5 and lower-arm switching elements T2, T4, T6 connected between a positive electrode and a negative electrode of a DC power supply 51. The upper-arm switching elements T1, T3, T5 are connected to the positive electrode of the DC power supply 51, that is, a power supply terminal. The lower-arm switching elements T2, T4, T6 are connected to the negative electrode of the DC power supply 51, that is, a ground terminal (ground).

The upper-arm switching element T1 and the lower-arm switching element T2 form a bridge circuit corresponding to a U phase. The upper-arm switching element T3 and the lower-arm switching element T4 form a bridge circuit corresponding to a V phase. The upper-arm switching element T5 and the lower-arm switching element T6 form a bridge circuit corresponding to a W phase. The upper-arm switching elements T1, T3, T5 may be referred to as high-side transistors. The lower-arm switching elements T2, T4, T6 may be referred to as low-side transistors.

Each of the upper-arm switching elements T1, T3, T5 is connected in series with the corresponding one of the lower-arm switching elements T2, T4, T6. That is, pairs of switching elements (the upper-arm switching element and the lower-arm switching element) connected together in series are connected together in parallel between the positive electrode and the negative electrode of the DC power supply 51 such that the number of the pairs is equal to the number of the phases. A node (that may be referred to as a middle point or a connection point) Pu between the upper-arm switching element T1 and the lower-arm switching element T2 is connected to a phase coil 20u as an output terminal for the U phase. A node Pv between the upper-arm switching element T3 and the lower-arm switching element T4 is connected to a phase coil 20v as an output terminal for the V phase. A node Pw between the upper-arm switching element T5 and the lower-arm switching element T6 is connected to a phase coil 20w as an output terminal for the W phase.

In the pair of switching elements T1 and T2, a drain of the upper-arm switching element T1 is connected to the positive electrode of the DC power supply 51, a gate of the upper-arm switching element T1 is connected to the driver 42, and a source of the upper-arm switching element T1 is connected to a drain of the lower-arm switching element T2 and the coil 20u of the motor 20. A gate of the lower-arm switching element T2 is connected to a driver (not depicted in the drawings), and a source of the lower-arm switching element T2 is connected to the ground. The other switching element pairs (T3 and T4, T5 and T6) are similarly connected.

The drivers apply the first voltage or the second voltage to the gates of the switching elements T1 to T6 in the inverter 40 in accordance with control signals a1 to a6 from the control unit 41. The first voltage is higher than the second voltage. Each of the switching elements T1 to T6 is turned on and off in a switchable manner by switching the voltage of the gate of the switching element between the first voltage and the second voltage. In FIG. 2, the drivers for the switching elements T2 to T6 are omitted.

In the present embodiment, the first voltage is a positive voltage higher than the ground voltage, and the second voltage is a negative voltage lower than the ground voltage. In the example depicted in FIG. 2, the first voltage corresponds to the voltage of a positive power supply 8 that supplies a voltage higher than the ground voltage. The second voltage corresponds to the voltage of a node Pm between the negative voltage circuit 43 and the negative power supply 9 supplying the voltage lower than the ground voltage.

The driver 42 switches the voltage to be applied to the gate of the upper-arm switching element T1 between the first voltage and the second voltage in accordance with the control signal a1. Specifically, the driver 42 includes switching elements Tb1 and Tb2. The switching element Tb1 is provided between the positive power supply 8 and the gate of the upper-arm switching element T1. The switching element Tb2 is provided between the node Pm and the gate of the upper-arm switching element T1. In the example depicted in FIG. 2, a source of the switching element Tb1 is connected to the positive power supply 8, a gate of the switching element Tb1 is connected to an input terminal for the control signal a1, and a drain of the switching element Tb1 is connected to a drain of the switching element Tb2. A source of the switching element Tb2 is connected to the node Pm, and a gate of the switching element Tb2 is connected to an input terminal for the control signal a1. The switching element Tb1 is of a p-channel type, and the switching element Tb2 is of an n-channel type. In this configuration, the switching element Tb1 and the switching element Tb2 are turned on and off in a complementary and switchable manner in accordance with the control signal a1 input to the driver 42.

The drivers similar to the driver 42 depicted in FIG. 2 are connected to the other upper-arm switching elements T3, T5. The drivers connected to the lower-arm switching elements T2, T4, T6 need not have the same configuration as that of the driver 42 depicted in FIG. 2. The drivers for the lower-arm switching element T2, T4, T6 may be configured such that, for example, the source of the switching element Tb2 of the driver 42 depicted in FIG. 2 is connected to the negative power supply 9. The paired upper-arm switching element and lower-arm switching element connected together in series (for example, T1 and T2) are turned on and off in a complementary manner by the drivers connected to the switching elements.

The circuit configuration of the driver 42 is not limited to the example illustrated in FIG. 2. For example, the driver 42 may include a logic circuit that determines signals to be output to the gates of the switching element Tb1 and the switching element Tb2 in accordance with the level (high or low) of the input control signal a1. For example, a logic circuit may be provided which executes signal processing so as to prevent the control signal a1 for the upper-arm switching element T1 and the control signal a2 for the lower-arm switching element T2 from turning high at the same time. Consequently, the upper-arm switching element T1 and the lower-arm switching element T2 may be controlled so as not to be turned on at the same time.

The negative voltage circuit 43 is connected between the negative power supply 9 and the node Pu between the upper-arm switching element T1 and the lower-arm switching element T2. In the example illustrated in FIG. 2, the negative voltage circuit 43 includes a Zener diode D1 and a capacitor C1 connected together in parallel between the node Pu and the negative power supply 9. The Zener diode D1 is arranged to pass a reverse current Iz (Zener current) from the node Pu toward the negative power supply 9.

The node Pm between the negative voltage circuit 43 and the negative power supply 9 is connected to the gate of the upper-arm switching element T1 via the switching element Tb2 of the driver 42. The negative voltage circuit 43 outputs a voltage that is lower than a voltage Vs of the node Pu (that is, the source voltage of the upper-arm switching element T1=the phase voltage in the U phase of the motor 20) by a given amount. In this example, a voltage Vpm of the node Pm is lower than the voltage Vs of the node Pu by the value of a Zener voltage Vz of the Zener diode D1 (Vpm=Vs−Vz). The voltage Vpm of the node Pm is used as the second voltage to be applied to the upper-arm switching element T1. That is, based on the voltage Vs of the node Pu, the negative voltage circuit 43 supplies a voltage lower than the voltage Vs as the second voltage to be applied to the upper-arm switching element T1 by the driver 42.

As described above, the negative voltage circuit 43 keeps the node Pm at a voltage having a constant potential difference from the voltage of the node Pu. In the present example, the negative voltage circuit 43 allows the node Pm between the node Pu and the negative power supply 9 to generate a negative voltage based on the node Pu. The negative voltage of the node Pm is supplied to the driver 42. The driver 42 applies the supplied negative voltage to the upper-arm switching element T1 as the second voltage. The node Pm may be referred to as the negative-voltage (second-voltage) supply node.

The power supply voltage of the negative power supply 9 is a negative voltage and may be, for example, based on the ground voltage. The negative power supply 9 may include, for example, a charge pump or a step-down chopper circuit. In contrast, the power supply voltage of the positive power supply 8 may be, for example, based on the voltage Vs of the node Pu. In a specific example, the positive power supply 8 may be a voltage obtained by increasing a power supply voltage Vbattery of the DC power supply 51 by a predetermined amount. The positive power supply 8 may include, for example, a step-up circuit based on a boot strap capacitor, a charge pump, a chopper step-up circuit, or a step-up circuit including a transformer.

The configuration of the negative voltage circuit 43 is not limited to the example illustrated in FIG. 2. The negative voltage circuit 43 may be a constant voltage circuit that allows the node Pm to generate a voltage lower than the voltage of the node Pu by a given amount. That is, the negative voltage circuit 43 may drop the voltage of the node Pu by any amount. For example, instead of the constant voltage circuit including the above-described Zener diode, a constant voltage circuit including a transistor or an operational amplifier may be used as the negative voltage circuit 43. The second voltage supplied to the upper-arm switching element T1 need not be the same as the voltage of the node Pm. The second voltage may correspond to the voltage of the node Pm.

Figure 3:
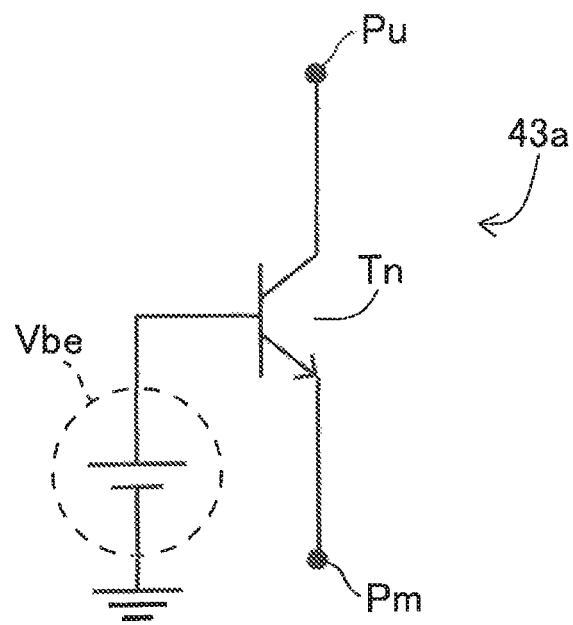
FIG. 3 is a diagram depicting a configuration example of a negative voltage circuit including a transistor.

FIG. 3 is a diagram depicting a configuration example of a negative voltage circuit 43a including a transistor. The negative voltage circuit 43a includes a transistor Tn connected between the node Pu and the node Pm. In this example, a collector of the transistor Tn is connected to the node Pu, and an emitter of the transistor Tn is connected to the node Pm. A bias voltage Vbe is applied to a base of the transistor Tn. A voltage lower than the voltage of the node Pu by the value of the bias voltage Vbe is supplied to the node Pm.

Figure 4:
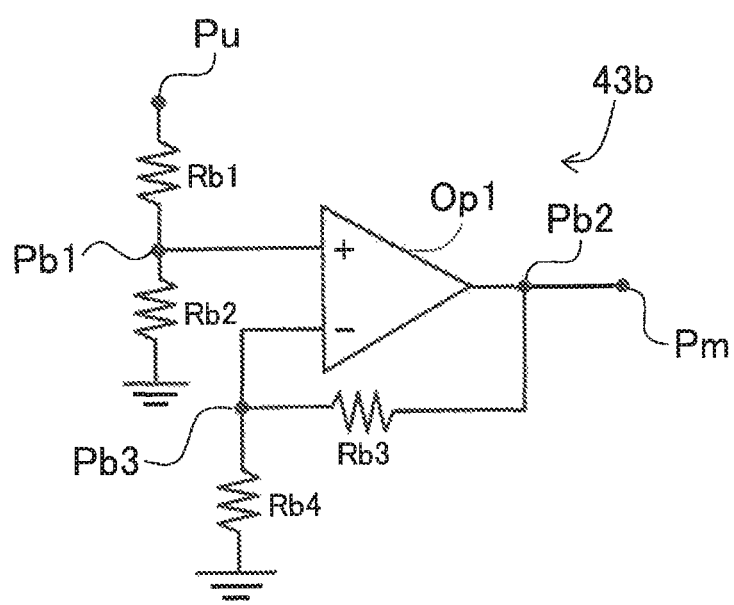
FIG. 4 is a diagram depicting a configuration example of a negative voltage circuit including an operational amplifier.

FIG. 4 is a diagram depicting a configuration example of a negative voltage circuit 43b including an operational amplifier. The negative voltage circuit 43b is configured to amplify a partial voltage between the node Pu and the ground (bias voltage) using a non-inverting amplifier circuit and output the amplified voltage. Specifically, the negative voltage circuit 43b includes two resistors Rb1, Rb2 connected together in series between the node Pu and the ground and a non-inverting amplifier circuit that amplifies a partial voltage between the resistors Rb1, Rb2.

The non-inverting amplifier circuit includes an operational amplifier Op1. A non-inverting input terminal of the operational amplifier Op1 is connected to a node Pb1 between the resistors Rb1, Rb2. An inverting input terminal of the operational amplifier Op1 is connected to an output terminal Pb2 of the operational amplifier Op1 via a resistor Rb3. This configuration enables negative feedback. The output terminal Pb2 of the operational amplifier Op1 is connected to the node Pm. A resistor Rb4 is connected between the ground and a node Pb3 between the non-inverting input terminal and a resistor Rb3. By way of example, a voltage division ratio of the resistor Rb1 to the resistor Rb2 may be 3:1, and a voltage division ratio of the resistor Rb3 to the resistor Rb4 may be 1:1.

The voltage dividing circuit 44 is connected between the negative voltage circuit 43 and the negative power supply 9. The voltage dividing circuit 44 performs voltage division between the negative voltage circuit 43 and the negative power supply 9. In the example illustrated in FIG. 2, the voltage dividing circuit 44 is connected between the node Pm and the negative power supply 9 to perform the voltage division between the node Pm and the negative power supply 9. The voltage dividing circuit 44 includes two resistors R1, R2 connected together in series between the negative voltage circuit 43 and the negative power supply 9. A voltage between the power supply voltage of the negative power supply 9 and the voltage of the node Pm is generated at the node Pn between the two resistors R1, R2. As described above, the voltage dividing circuit 44 generates the voltage between the power supply voltage of the negative power supply 9 and the voltage of the node Pm at the node Pn between the negative power supply 9 and the negative voltage circuit 43.

The voltage dividing circuit 44 also has a function to limit the Zener current Iz. In the example illustrated in FIG. 2, the Zener current Iz is limited to Iz=(Vs−Vz)/(r1+r2). In the equation, resistance values of the resistors R1, R2 are denoted by r1, r2, and the Zener voltage of the Zener diode is denoted by Vz. This limitation allows prevention of flow of an excess current through the Zener diode D1 and thus allows prevention of a possible failure in the Zener diode D1. Furthermore, due to the series connection of the plurality of resistors R1, R2, even when one of the resistors R1, R2 is short-circuited and fails, the other resistor serves to maintain the function to suppress the Zener current Iz. This allows prevention of flow of an excess current through the Zener diode D1 and thus allows prevention of a possible failure in the Zener diode D1.

The configuration of the voltage dividing circuit 44 is not limited to the example illustrated in FIG. 2. For example, the voltage dividing circuit 44 may include three or more resistors connected together in series or resistors connected together in parallel with respect to a plurality of resistors connected together in series.

The detection unit 45 outputs a signal based on the voltage resulting from the voltage division by the voltage dividing circuit 44. In the example illustrated in FIG. 2, the detection unit 45 retrieves the voltage resulting from the voltage division through a line connected to the node Pn between the resistors R1, R2 in the voltage dividing circuit 44. The detection unit 45 includes a level shift circuit 47 that shifts the level of the voltage resulting from the voltage division. The level shift circuit 47 is connected to the node Pn. The level shift circuit 47 is also connected to the control unit 41 via an AD converter (ADC) 46. The level shift circuit 47 outputs a voltage resulting from the level shift to the ADC 46. The ADC 46 may be a component included in a microcomputer forming the control unit 41. The level shift circuit 47 converts the voltage of the node Pn into a level within a range that can be dealt with by the ADC 46.

The configuration of the level shift circuit 47 is not particularly limited. For example, the level shift circuit 47 may include an input terminal, an output terminal, a reference voltage terminal that receives a reference voltage, and a ground terminal connected to the ground. In this case, the level shift circuit 47 shifts the voltage received through the input terminal and outputs the resultant voltage through the output terminal. At this time, the output voltage is between the reference voltage and the ground voltage and has a value equal to the value of the input signal plus or minus a given voltage value.

Figure 5:
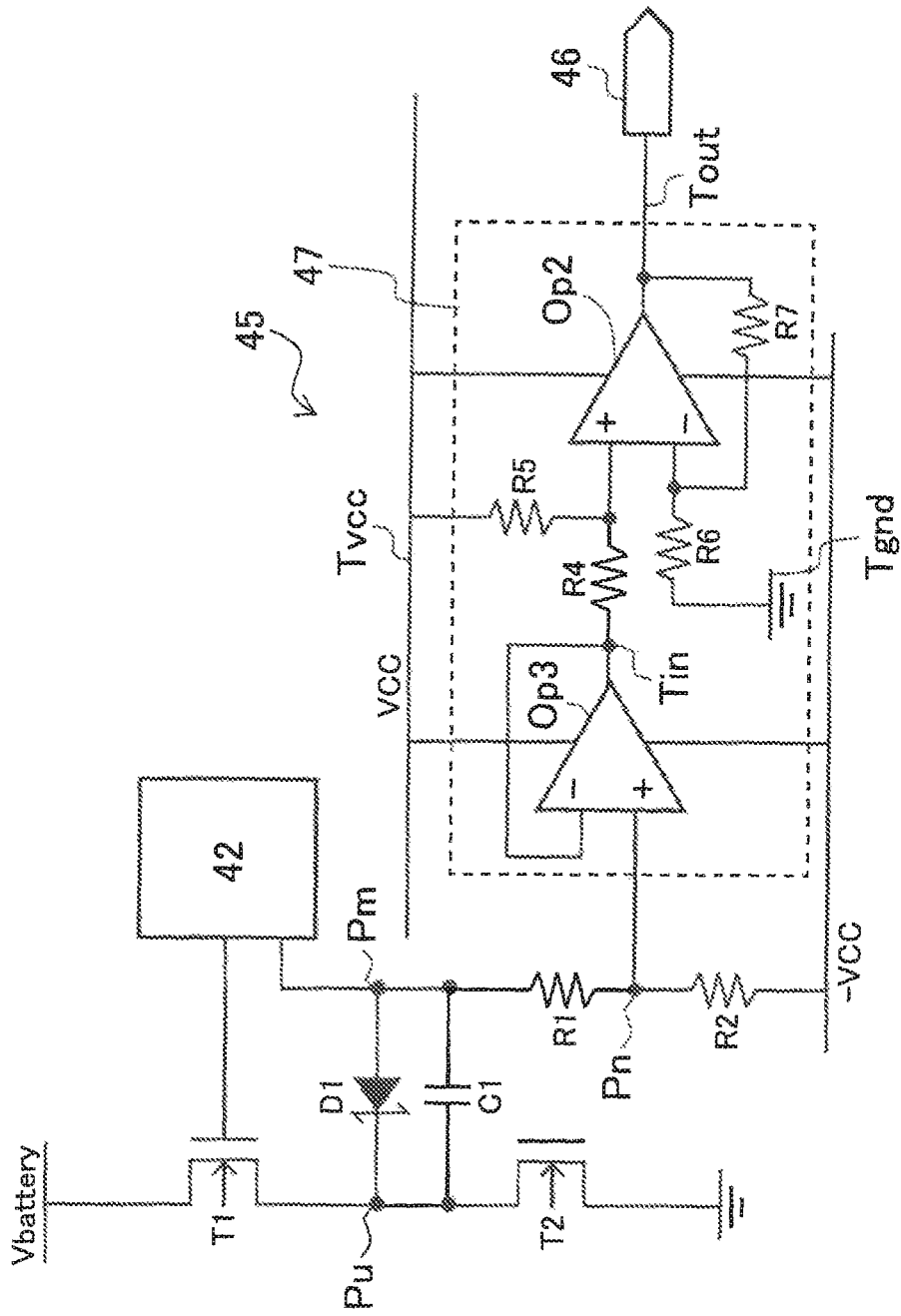
FIG. 5 is a diagram depicting a configuration example of a level shift circuit.

FIG. 5 is a diagram depicting a configuration example of the level shift circuit 47. In the example illustrated in FIG. 5, the level shift circuit 47 includes an input terminal Tin, an output terminal Tout, a reference voltage terminal Tvcc, and a ground terminal Tgnd. In the level shift circuit 47, the non-inverting amplifier circuit amplifies a partial voltage generated between the input terminal Tin and the reference voltage terminal Tvcc to output the resultant voltage. In the example, an operational amplifier Op3 is interposed between the input terminal Tin and the node Pn. The operational amplifier Op3 functions as a buffer.

The level shift circuit 47 has two resistors R4, R5 connected together in series between the input terminal Tin and the reference voltage terminal Tvcc, and an operational amplifier Op2 connected between a node between the resistors R4, R5 and the output terminal Tout. The operational amplifier Op2 forms a non-inverting amplifier circuit that amplifies a voltage signal between the resistors R4, R5.

A non-inverting input terminal of the operational amplifier Op2 is connected to the node between the resistors R4, R5. An inverting input terminal of the operational amplifier Op2 is connected to an output terminal of the operational amplifier Op2 via a resistor R7. This configuration enables negative feedback. The output terminal of the operational amplifier Op2 is connected to the output terminal Tout of the level shift circuit 47. A resistor R6 is connected between the ground terminal Tgnd and a node between the inverting input terminal of the operational amplifier Op2 and a resistor R7.

The voltage of the node Pn detected by the detection unit 45 varies according to the voltage of the node Pm. In the example illustrated in FIG. 2, a voltage Vpn of the node Pn is Vpn=(Vs−Vz×r2/(r1+r2)+(negative power supply voltage)×r1/(r1+r2). That is, the voltage input to the level shift circuit 47 varies in proportion to the potential of the node Pu. Thus, the output value from the detection unit 45 reflects the voltage of the node Pu, that is, the phase voltage in the U phase. Consequently, the phase voltage can be monitored.

The voltage of the node Pn is varied by a failure in the resistor R1 or R2. Consequently, the output value from the detection unit 45 enables abnormality in the voltage dividing circuit 44 to be detected. The voltage of the node Pn is also varied by a failure in the capacitor C1 or the Zener diode D1. Consequently, the output value from the detection unit 45 also enables abnormality in the negative voltage circuit 43 to be detected. The voltage of the node Pn is also varied by a fluctuation of the voltage in the negative power supply 9. Consequently, the output value of the detection unit 45 also enables abnormality in the negative power supply 9 to be detected.

As described above, the output value from the detection unit 45 enables detection of abnormality in the voltage dividing circuit 44, the negative voltage circuit 43, and the negative power supply 9 and monitoring of the phase voltage. The voltage dividing circuit 44 and the detection unit 45 provide both a phase voltage detection function and a negative-voltage detection function. This eliminates the need to provide a separate negative-voltage detection circuit in addition to a phase voltage detection circuit. That is, monitoring of the phase voltage and the negative voltage can be achieved using the simple configuration.

Like the node Pu, the node Pv and the node Pw connect to the negative voltage circuit 43, the voltage dividing circuit 44, and the detection unit 45, though this is not depicted in FIG. 2.

The switching elements T1 to T6 in the inverter 40 may be, for example, field-effect transistors (FETs) or bipolar transistors. As an example of the FETs, metal-oxide-semiconductors (MOSFETs) may be used. The MOSFET may contain, for example, SiC or GaN. As an example of the bipolar transistors, insulated gate bipolar transistors (IGBTs) may be used.

The switching elements T1 to T6 may be either normally-on or -off transistors. The normally-on transistors have a threshold voltage Vth lower than 0 and are turned on when a gate voltage and a source voltage are at the same potential. The normally-off transistors have a threshold voltage Vth higher than 0 and are turned off when the gate voltage and the source voltage are at the same potential.

MOSFETs containing GaN normally provide normally-on elements and allow quicker switching operations to be achieved than conventional MOSFETs containing Si. To turn a normally-on transistor off, a negative voltage lower than the ground voltage (0 V) is supplied to a gate of the normally-on transistor. When a supply system for the negative voltage fails, the normally-on transistor may fail to be turned off.

Thus, when the switching elements T1 to T6 are normally-on transistors, it is preferable that, like the present embodiment, the phase voltage monitoring circuit have a function to monitor the negative voltage. This enables abnormality in the supply system for the negative voltage to be detected using the simple configuration. For example, fail safe control is enabled in which operation of the motor control apparatus is stopped when abnormality in the supply system for the negative voltage is detected. As a result, safety of the motor control apparatus is enhanced. For example, normally-on GaN transistors may be used as the switching elements T1 to T6. In this case, excellent switching characteristics are obtained, and the safety can further be enhanced.

Switching of the switching elements T1 to T6 allows a DC voltage from the DC power supply 51 (DC voltage Vbattery) to be converted into AC voltages in three phases (U phase, V phase, W phase). The resultant three-phase AC voltages are supplied to the phase coils 20u to 20v of the motor 20 via the nodes Pu, Pv, Pw, respectively, to rotate the motor 20.

Specifically, the control unit 41 outputs a PWM drive signal to the driver 42 as a control signal to perform PWM driving on the inverter 40. The switching element pairs (T1 and T2; T3 and T4; T5 and T6) corresponding to the U phase, the V phase, and the W phase, respectively, are controlled and turned on and off (their electric continuity states are controlled) by pairs of PWM drive signals (a1 and a2; a3 and a4; a5 and a6) corresponding to the respective phases. The paired PWM drive signals in each phase are in an inverting relation. Consequently, voltages obtained at the nodes Pu, Pv, Pw for the respective phases are applied to the motor 20 as a U-phase voltage, a V-phase voltage, and a W-phase voltage. Thus, the U-phase voltage, the V-phase voltage, and the W-phase voltage are supplied to the motor 20.

Feeders between the motor 20 and the nodes Pu, Pv, Pw are provided with current sensors 48u to 48w that detect phase current values Iu to Iw, respectively. Outputs from the current sensors 48u to 48w are loaded into the control unit 41. The control unit 41 loads the steering torque τ from the torque sensor 5, the vehicle speed V from the vehicle speed sensor 7, and the rotation angle θma from the rotation angle sensor 6. The output from the detection unit 45 is also loaded into the control unit 41. The output from the detection unit 45 contains information on the phase voltage in each phase.

The control unit 41 receives the phase current values Iu to Iw, the steering torque τ, the vehicle speed V, and the rotation angle θma of the motor, and based on these values, generates a control signal. For example, based on the steering torque τ, the vehicle speed V, the rotation angle θma, and the phase current values Iu to Iw, the control unit 41 generates voltage command values Vu*, Vv*, Vw* in the respective phases of the motor 20. Based on the voltage command values Vu*, Vv*, Vw*, the control unit 41 generates PWM drive signals a1, a3, a5 and negation signals a2, a4, a6 therefor as control signals.

Figure 6:
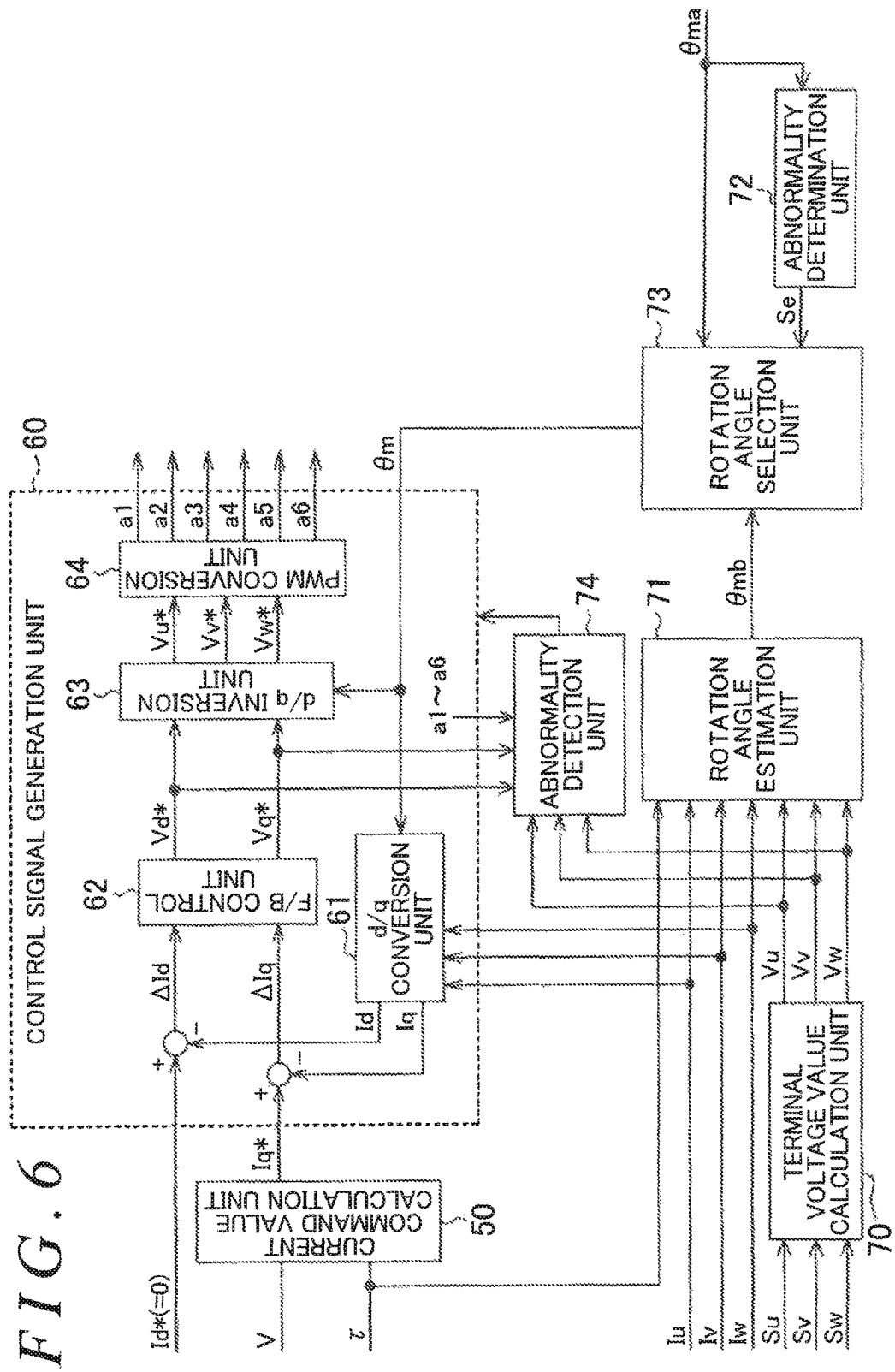
FIG. 6 is a block diagram depicting a configuration example of a control unit.

FIG. 6 is a block diagram depicting a configuration example of the control unit 41. In the example illustrated in FIG. 6, the control unit 41 has a current command value calculation unit 50 that calculates current command values corresponding to a target assist torque and a control signal generation unit 60 that generates the PWM drive signals a1 to a6 corresponding to the current command values.

Based on the vehicle speed V and the steering torque τ, the current command value calculation unit 50 calculates a q-axis current command value Iq* that is a current command value on a q axis in a d/q coordinate system. Specifically, the absolute value set for the q-axis current command value Iq* increases as the absolute value of the steering torque τ increases and as the vehicle speed V decreases. In the control unit 41, a d-axis current command value Id* is fixed to zero.

The phase current values Iu to Iw and a motor rotation angle (electrical angle) θm are input to the control signal generation unit 60. The motor rotation angle θm is set, by a rotation angle selection unit 73, equal to one of the detected motor rotation angle θma of the rotation angle sensor 6 and an estimated motor rotation angle (electrical angle) θmb calculated by a rotation angle estimation unit 71. Based on these pieces of input information, the control signal generation unit 60 performs current feedback control in the d/q coordinate system to generate the PWM drive signals a1 to a6.

Specifically, the phase current values Iu to Iw and the motor rotation angle θm are input to a d/q conversion unit 61. The d/q conversion unit 61 maps the phase current values Iu to Iw onto the d/q coordinates to calculate a d-axis current value Id and a q-axis current value Iq that are actual current values of the motor 20 in the d/q coordinate system. Then, a deviation ΔId between the d-axis current value Id and the d-axis current command value Id* is calculated, and the resultant value is input to an F/B control unit 62. A deviation ΔIq between the q-axis current value Iq and the q-axis current command value Iq* is also calculated, and the resultant value is input to the F/B control unit 62.

In order to allow the d-axis current value Id to follow the d-axis current command value Id*, the F/B control unit 62 calculates a d-axis voltage command value Vd* by performing current feedback control based on the d-axis current deviation ΔId. In order to allow the q-axis current value Iq to follow the q-axis current command value Iq*, the F/B control unit 62 calculates a q-axis voltage command value Vq* by performing current feedback control based on the q-axis current deviation ΔIq. The F/B control unit 62 outputs the calculated d-axis voltage command value Vd* and q-axis voltage command value Vq* to a d/q inversion unit 63.

The motor rotation angle θm is also input to the d/q inversion unit 63. The d/q inversion unit 63 calculates phase voltage command values Vu* to Vw* in a three-phase AC coordinate system by mapping the d-axis voltage command value Vd* and the q-axis voltage command value Vq* onto the three-phase AC coordinate system based on the motor rotation angle θm. The d/q inversion unit 63 outputs the calculated phase voltage command values Vu* to Vw* to a PWM conversion unit 64.

The PWM conversion unit 64 performs PWM conversion on the phase voltage command values Vu* to Vw* to generate the PWM drive signals a1 to a6. As depicted in FIG. 2, the control unit 41 outputs the PWM drive signals a1 to a6 to the drivers connected to the gate terminals of the switching elements T1 to T6 in the inverter 40, respectively. Consequently, drive currents corresponding to the PWM drive signals a1 to a6 are supplied to the motor 20 to allow execution of assist control in which a motor torque is applied to the steering shaft 11.

If any abnormality occurs in the rotation angle sensor 6, the control unit 41 may perform what is called rotation angle sensorless control in which the motor 20 is continuously controlled and driven utilizing information on each phase voltage based on the output from the detection unit 45. Now, the rotation angle sensorless control will be described in detail.

As depicted in FIG. 6, the control unit 41 has a terminal voltage value calculation unit 70 that calculates phase terminal voltages (to be more exact, the detected values of the phase terminal voltages) Vu to Vw of the motor 20 based on detection signals Su to Sw from the detection units 45 connected to the nodes Pu, Pv, Pw for the respective nodes. The terminal voltage value calculation unit 70 outputs the calculated phase terminal voltages Vu to Vw to a rotation angle estimation unit 71.

The steering torque τ and the phase current values Iu to Iw are also input to the rotation angle estimation unit 71. Based on these pieces of input information, the rotation angle estimation unit 71 calculates an estimated value θmb of the motor rotation angle to output the calculated estimated motor rotation angle θmb to the rotation angle selection unit 73.

The rotation angle estimation unit 71 can, for example, calculate an induced voltage value of the motor 20 based on the phase terminal voltage detected values obtained from the detection signals Su to Sw from the detection units corresponding to the respective phases and can calculate an estimated value of an angular velocity of the motor 20 to estimate the rotation angle of the motor 20 based on the estimated motor angular velocity. In this configuration, the rotation angle estimation unit 71 may estimate the rotation angle of the motor based on the estimated motor angular velocity if the absolute value of the induced voltage value is larger than a predetermined threshold and may estimate the rotation angle of the motor based on the steering torque if the absolute value of the induced voltage value is equal to or smaller than the predetermined threshold.

The control unit 41 has an abnormality determination unit 72 that detects abnormality in the rotation angle sensor 6 based on the detected motor rotation angle θma from the rotation angle sensor 6. Upon detecting abnormality in the rotation angle sensor 6, the abnormality determination unit 72 outputs an abnormality detection signal Se to the rotation angle selection unit 73.

The detected motor rotation angle θma from the rotation angle sensor 6 is also input to the rotation angle selection unit 73. When the rotation angle sensor 6 is normal, the rotation angle selection unit 73 outputs the detected motor rotation angle θma from the rotation angle sensor 6 to the control signal generation unit 60 as the motor rotation angle θm. Upon receiving the abnormality detection signal Se output from the abnormality determination unit 72, the rotation angle selection unit 73 outputs an estimated motor rotation angle θmb to the control signal generation unit 60 as the motor rotation angle θm. As described above, the control unit 41 controls and drives the motor 20 using the rotation angle sensor 6 if the rotation angle sensor 6 is normal and continues to control and drive the motor 20 without using the rotation angle sensor 6 if any abnormality occurs in the rotation angle sensor 6.

In the above-described example, the control unit 41 is configured to estimate the rotation angle of the motor using the phase terminal voltage detected values obtained from the detection signals Su to Sw from the detection units 45, to generate control signals based on the estimated rotation angle. A process for generating control signals using the detection signals Su to Sw is not limited to this example.

The processing by and the configuration of the control unit 41 are not limited to the above-described example. For example, instead of the above-described configuration, the control signal generation unit 60 of the control unit 41 has a configuration in which a target value It of a current to be passed to the motor 20 is determined based on the steering torque τ and the vehicle speed V and in which the voltage command values Vu*, Vv*, Vw* are determined in accordance with a motor circuit equation based on the target value It and the rotation position of (rotation angle θm) of a rotor in the motor 20. Parameters used in the motor circuit equation may be modified based on a current detected value Im. The current detected value Im may be detected, for example, based on the voltages of the opposite ends of a current detection resistor provided in the inverter 40 depicted in FIG. 2. The current detection resistor may be interposed between the ground (the negative electrode of the DC power supply) and the lower-arm switching elements T2, T4, T6.

In the example illustrated in FIG. 6, the control unit 41 may further include an abnormality detection unit 74 that detects abnormality in the negative voltage based on the detection signals Su to Sv output from the detection units 45. The abnormality detection unit 74 may determine that the circuit supplying the negative voltage is abnormal when the detection signals Su to Sw or the phase terminal voltage detected values obtained from the detection signals Su to Sv fall out of a predetermined range. When the detection signals Su to Sv or the values based on the detection signals Su to Sv fall out of the predetermined range, the abnormality detection unit 74 may determine which of the negative voltage circuit 43, the voltage dividing circuit 44, and the negative power supply 9 is abnormal according to the signals or values. The abnormality detection unit 74 may determine whether or not the circuit supplying the negative voltage in each phase is abnormal, based on the signal output from the detection unit 45 for the phase.

By way of example, the abnormality detection unit 74 may determine whether the node Pu correctly has a high voltage (power supply voltage Vbattery) when the upper-arm switching element T1 is on and/or whether the node Pu correctly has a low voltage (ground potential) when the lower-arm switching element T2 is on. This allows determination of whether or not the upper-arm switching element T1 and the lower-arm switching element T2 operate normally. In this case, the abnormality detection unit 74 may determine when the upper-arm switching element T1 and the lower-arm switching element T2 are on, for example, using the control signals a1, a2 output from the control unit 41.

The abnormality detection unit 74 may also determine abnormality further using signals from the control signal generation unit 60. In the example depicted in FIG. 6, the d-axis voltage command value Vd* and the q-axis voltage command value Vq* are input to the abnormality detection unit 74. The abnormality detection unit 74 may determine whether or not the motor 20 is being driven based on the d-axis voltage command value Vd* and the q-axis voltage command value Vq*. For example, the abnormality detection unit 74 may execute abnormality determination on each phase terminal voltage detected value immediately after the motor 20 starts to be driven. Consequently, whether or not the circuit supplying the negative voltage has failed can be determined when the motor is started.

Upon detecting abnormality, the abnormality detection unit 74 outputs a signal indicative of abnormality to the control signal generation unit 60. Upon receiving the signal indicative of abnormality, the control signal generation unit 60, for example, interrupts generation of the PWM drive signals a1 to a6. Consequently, the motor 20 is stopped. As described above, when abnormality is detected, fail safe control is performed in which the motor 20 is stopped.

The configuration of the abnormality detection unit 74 is not limited to the example illustrated in FIG. 6. For example, the abnormality detection unit 74 performs the abnormality determination using the phase terminal voltages Vu to Vw calculated by the terminal voltage value calculation unit 70. However, The abnormality determination may be performed using the detection signals Su to Sw. The abnormality detection unit 74 may perform the abnormality determination without using the signals Vd*, Vq* from the control signal generation unit 60.

Now, examples of operations performed by the motor control apparatus 4 at the time of normality and at the time of abnormality will be described. FIGS. 7A to 7D are diagrams depicting a part of the configuration in FIG. 2. FIGS. 7A to 7D illustrate the electric continuity states of the switching elements T1, T2, Tb1 and Tb2, the voltages of the nodes Pu, Pm and Pn, and the voltages output from the level shift circuit 47 during the operations. The values of these voltages are obtained when the ground voltage is 0 V.

The examples illustrated in FIGS. 7A to 7D are operation examples under the following conditions. The power supply voltage of the positive power supply 8 is 17V, the power supply voltage Vbattery of the DC power supply is 12 V, the power supply voltage of the negative power supply 9 is −5 V, and the Zener voltage Vz of the Zener diode D1 is 5 V. The amount of shift in voltage performed by the level shift circuit 47 is +5 V. The ratio of the resistance value r1 of the resistor R1 to the resistance value r2 of the resistor R2 in the voltage dividing circuit 44 is 2:1. The upper and lower-arm switching elements T1, T2 are normally-on transistors. The above-described conditions are illustrative, and the motor control apparatus 4 are not limited to the above-described conditions.

Figure 7A:
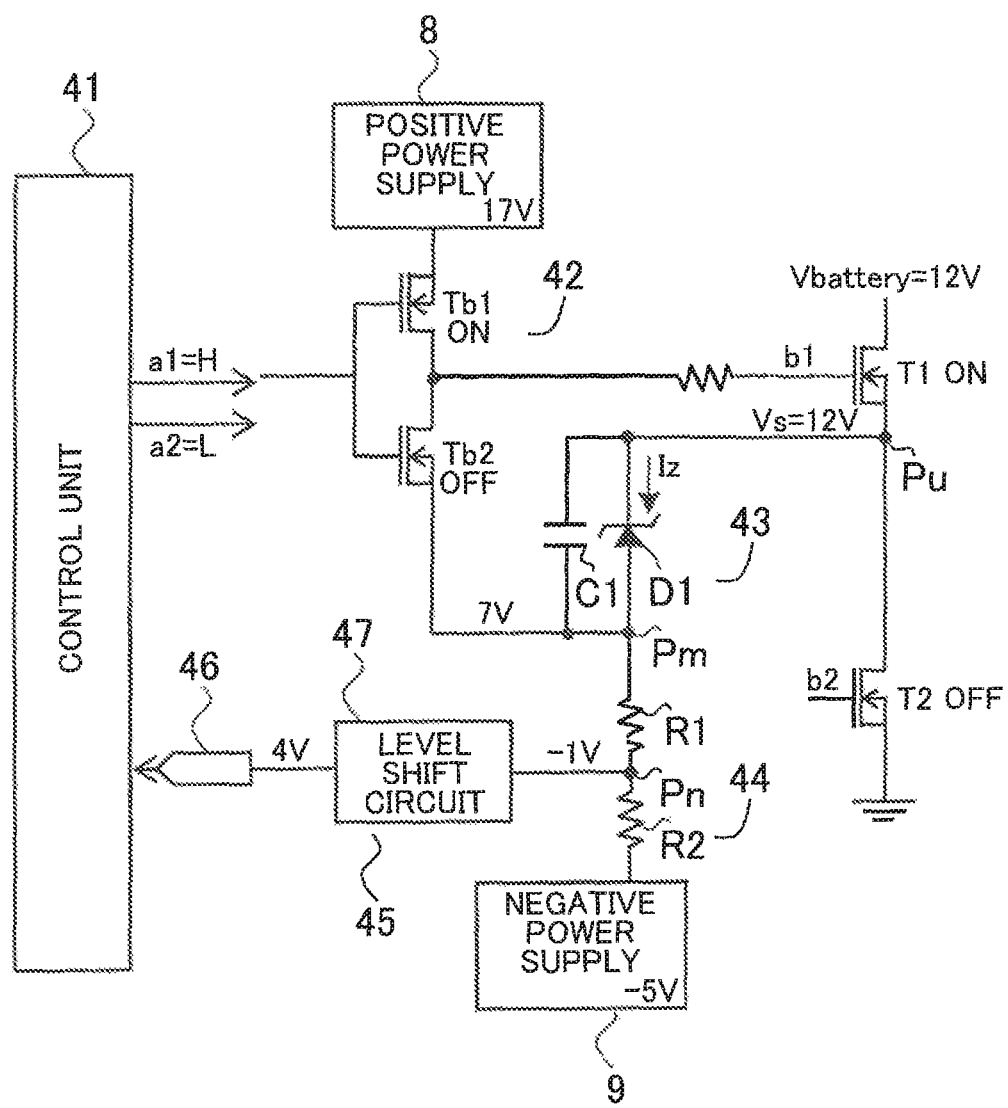
FIG. 7A is a diagram depicting an example of a state of the motor control apparatus during a normal operation.

FIG. 7A illustrates a state where, during a normal operation, the upper-arm switching element T1 is on, while the lower-arm switching element T2 is off. In this case, the control unit 41 outputs the control signal a1 at a high level (H) to the driver 42 that drives the upper-arm switching element T1 and outputs the control signal a2 at a low level (L) to the driver (not depicted in the drawings) that drives the lower-arm switching element T2. The switching element Tb1 connected to the driver 42 is turned on, and the switching element Tb2 is turned off. The power supply voltage (17 V) of the positive power supply is applied to the gate of the upper-arm switching element T1. The upper-arm switching element T1 is turned on. The control signal a2=L allows the lower-arm switching element T2 to be turned off. Thus, the voltage of the node Pu is set equal to the power supply voltage Vbattery of the DC power supply=12 V. A potential Vgs stored in the capacitance between the gate and source of the upper-arm switching element T1 is −5 V. The voltage of the node Pm is lower than the voltage of the node Pu, 12 V, by the Zener voltage Vz=5 V, and is thus 7 V. The potential difference between the node Pm and the negative power supply is 7−(−5)=12 V. The potential difference is subjected to the voltage division by the resistors R1, R2. The voltage of the node Pn is set to −1 V. The output from the level shift circuit 47 is −1+5=4 V.

Figure 7B:
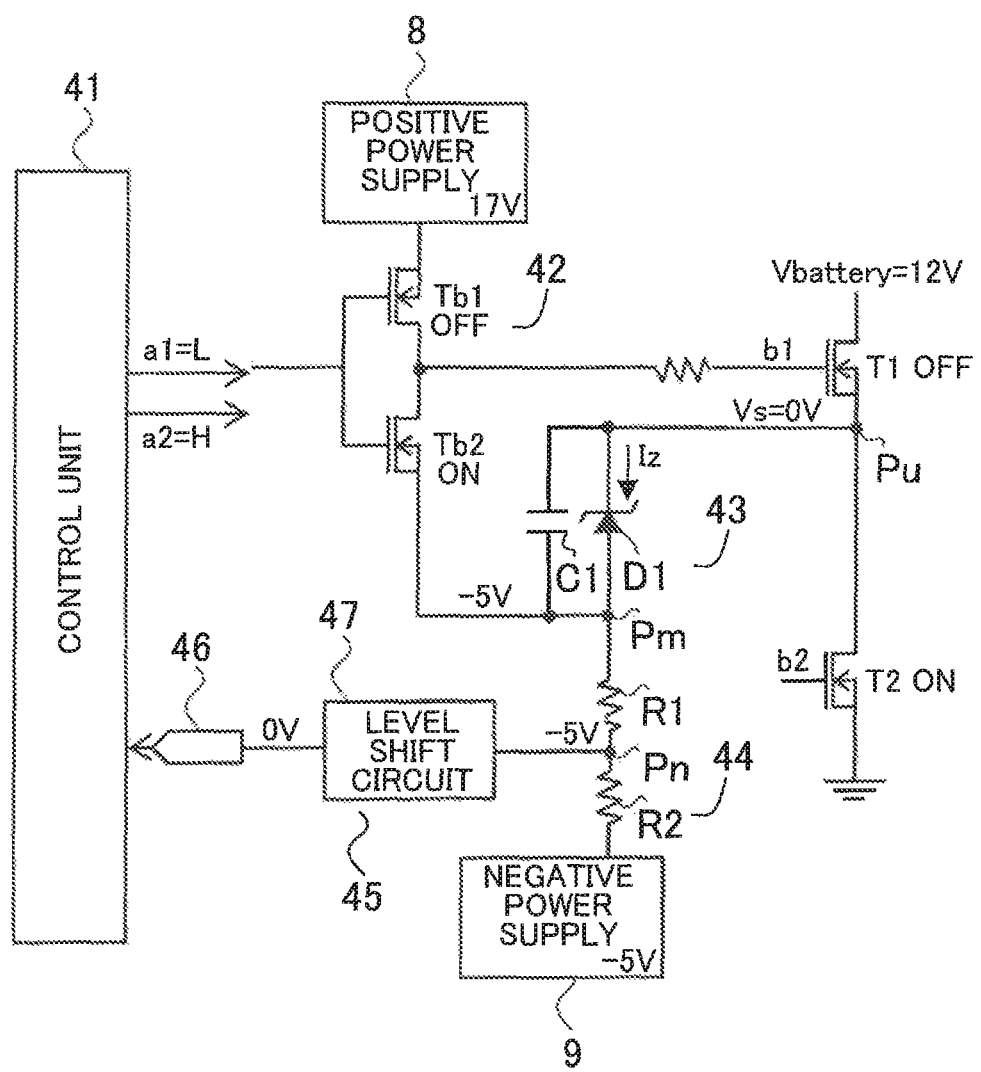
FIG. 7B is a diagram depicting another example of the state of the motor control apparatus during a normal operation.

FIG. 7B illustrates a state where, during a normal operation, the upper-arm switching element T1 is off, while the lower-arm switching element T2 is on. In this case, the control unit 41 outputs the control signal a1 at the low level (L) to the driver 42 that drives the upper-arm switching element T1 and outputs the control signal a2 at the high level (H) to the driver (not depicted in the drawings) that drives the lower-arm switching element T2. The switching element Tb1 connected to the driver 42 is turned off, and the switching element Tb2 is turned on. The negative voltage (−5 V) is applied to the gate of the upper-arm switching element T1. The upper-arm switching element T1 is turned off. The control signal a2=H allows the lower-arm switching element T2 to be turned on. Thus, the voltage of the node Pu changes from 12 V to the ground voltage=0 V. At this time, the potential (Vgs=−5 V) stored in the capacitance between the gate and source of the upper-arm switching element T1 remains the same, with the gate potential shifted from 7 V to −5 V. The voltage of the node Pm is lower than the voltage of the node Pu, 0 V, by the Zener voltage Vz=5 V and is thus −5 V. The voltage of the node Pm and the voltage of the negative power supply are both −5 V. The voltage of the node Pn is also −5 V. The output from the level shift circuit 47 is −5+5=0 V.

As depicted in FIG. 7A and FIG. 7B, during a normal operation, the voltage output from the detection unit 45 is 4 V when T1=on and T2=off, and is 0 V when T1=off and T2=on. The voltage Vs of the node Pu is 12 V when T1=on and T2=off, and is 0 V when T1=off and T2=on. The voltage of the node Pn is −1 V when T1=on and T2=off, and is −5 V when T1=off and T2=on. As described above, the voltage input to the level shift circuit 47 varies in proportion to the voltage Vs of the node Pu. Thus, the output voltage from the detection unit 45 during a normal operation has a value that reflects the voltage Vs of the node Pu.

The voltage dividing circuit 44 makes the range of the varying output voltage from the detection unit 45 during a normal operation (in the above-described example, 0 to 4 V) smaller than the range of the voltage Vs of the node Pu (in the above-described example, 0 to 12 V). Thus, the range of the voltage Vs of the node Pu that can be detected by the control unit 41 is wider than the range of voltages that can be identified by the ADC 46. In the above-described example, for example, even if the range of the voltage that can be identified by the ADC 46 is 0 to 5 V, the control unit 41 can identify both Vs=12 V and Vs=0 as the voltage of the node Pu. As described above, the voltage dividing circuit 44 is provided between the negative voltage circuit 43 connected to the node Pu and the negative power supply 9 to detect the voltage resulting from the voltage division. Thus, the range of identifiable phase voltages can be widened.

In the present example, the negative voltage circuit 43 is provided with the capacitor C1 connected in parallel with the Zener diode D1. The capacitor C1 enables a reduction in a delay in switching of the upper-arm switching element T1. By way of example, an operation in the examples illustrated in FIG. 7A and FIG. 7B will be described which is performed when the motor control apparatus does not include the capacitor C1. In this case, when the switching element Tb2 in the driver 42 is turned on after the switching element Tb1 in the driver 42 is turned off, the charge at the gate (17 V) of the switching element T1 flows into the source (12 V) of the switching element T1. Consequently, the voltage of the gate decreases to 12.6 V, which is higher than the voltage of the source by approximately the value of the forward voltage (for example, 0.6 V) of the Zener diode D1. At this time, the upper-arm switching element T1 remains on. Subsequently, the charge at the gate is extracted via the resistors R1, R2 to generate the Zener voltage of the Zener diode D1. Consequently, the upper-arm switching element T1 is turned off. A speed at which the charge at the gate is extracted depends on an input capacitance of the upper-arm switching element T1 and a time constant for the resistors R1+R2. Therefore, the timing when the upper-arm switching element T1 is turned off is delayed according to the time constant.

In contrast, if the motor control apparatus includes the capacitor C1 as depicted in FIG. 7A and FIG. 7B, when the switching element Tb2 in the driver 42 is turned on after the switching element Tb1 in the driver 42 is turned off, the capacitor C1 is discharged via the switching element Tb2 to reduce the potential of the gate of the upper-arm switching element T1. Consequently, the voltage of the gate decreases from 17 V to the voltage of the node Pm, 7 V, to turn the upper-arm switching element T1 off. After the upper-arm switching element T1 is turned off, the source potential decreases. At this time, the charge in the capacitor C1 remains unvaried, and consequently, the potential of the anode of the Zener diode D1 may decrease close to −5 V. The resistors R1, R2 have a function to regulate the Zener current to contribute to stable operations of the Zener diode D1. However, the resistors R1, R2 do not substantially contribute to delaying the operation of turning the upper-arm switching element off. Thus, the capacitor C1 allows responsiveness of the upper-arm switching element to be enhanced.

Figure 7C:
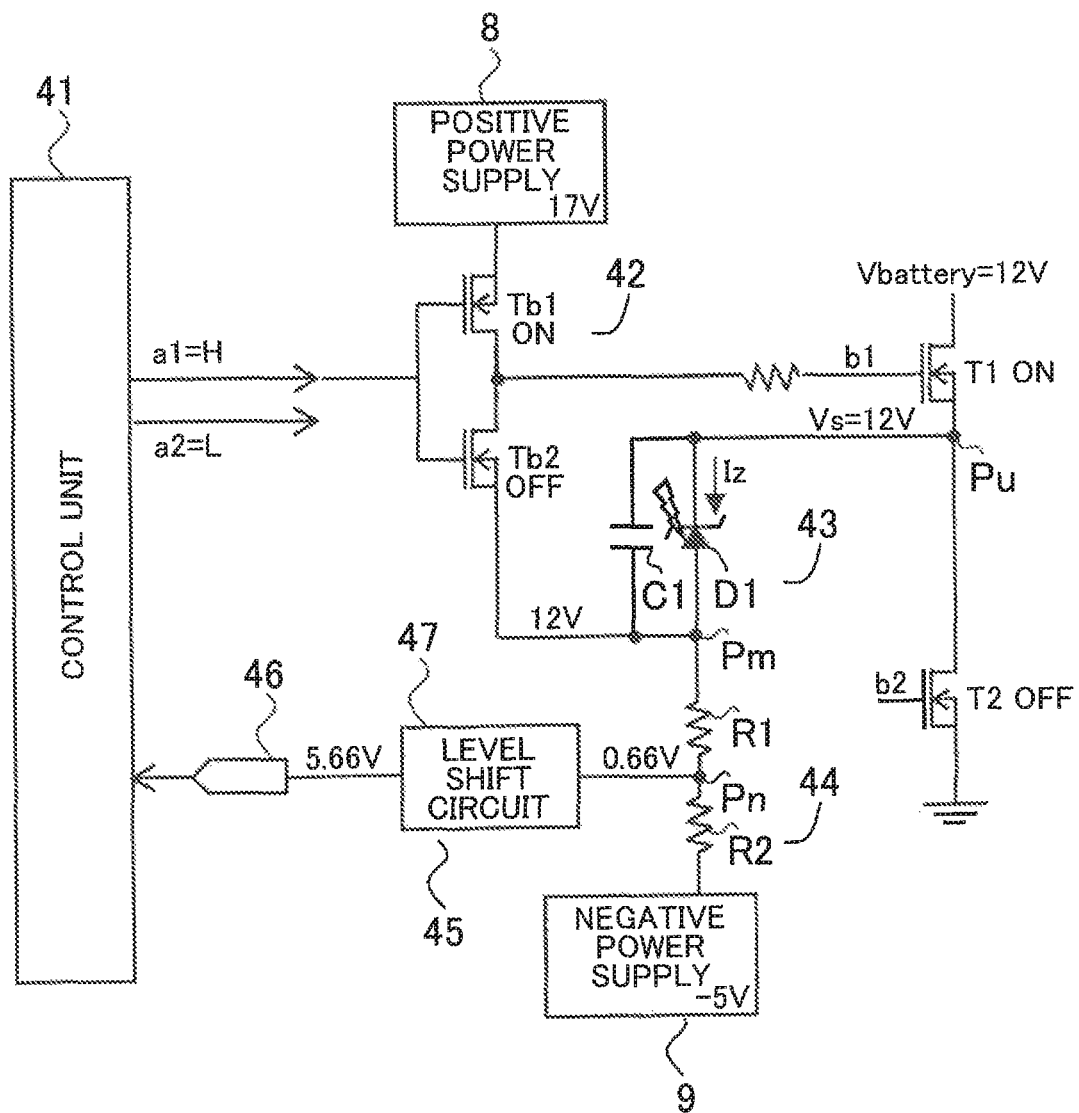
FIG. 7C is a diagram depicting an example of a state of the motor control apparatus during an abnormal operation.

FIG. 7C illustrates a state where the negative voltage circuit 43 is abnormal. In the example illustrated in FIG. 7C, the Zener diode D1 is short-circuited and fails, and the upper-arm switching element T1 is on, whereas the lower-arm switching element T2 is off. In this case, the voltage of the node Pm is the same as the voltage Vs of the node Pu=12 V. Thus, the voltage of the node Pn is approximately 0.66 V, and the voltage output from the level shift circuit 47 is 5.66 V. This value falls out of the range of detected values obtained at the time of normality. Therefore, the control unit 41 may prerecord the range of detected values obtained at the time of normality and determine whether the negative voltage circuit 43 is abnormal depending on whether or not the value of the voltage detected by the detection unit 45 falls within this range.

Figure 7D:
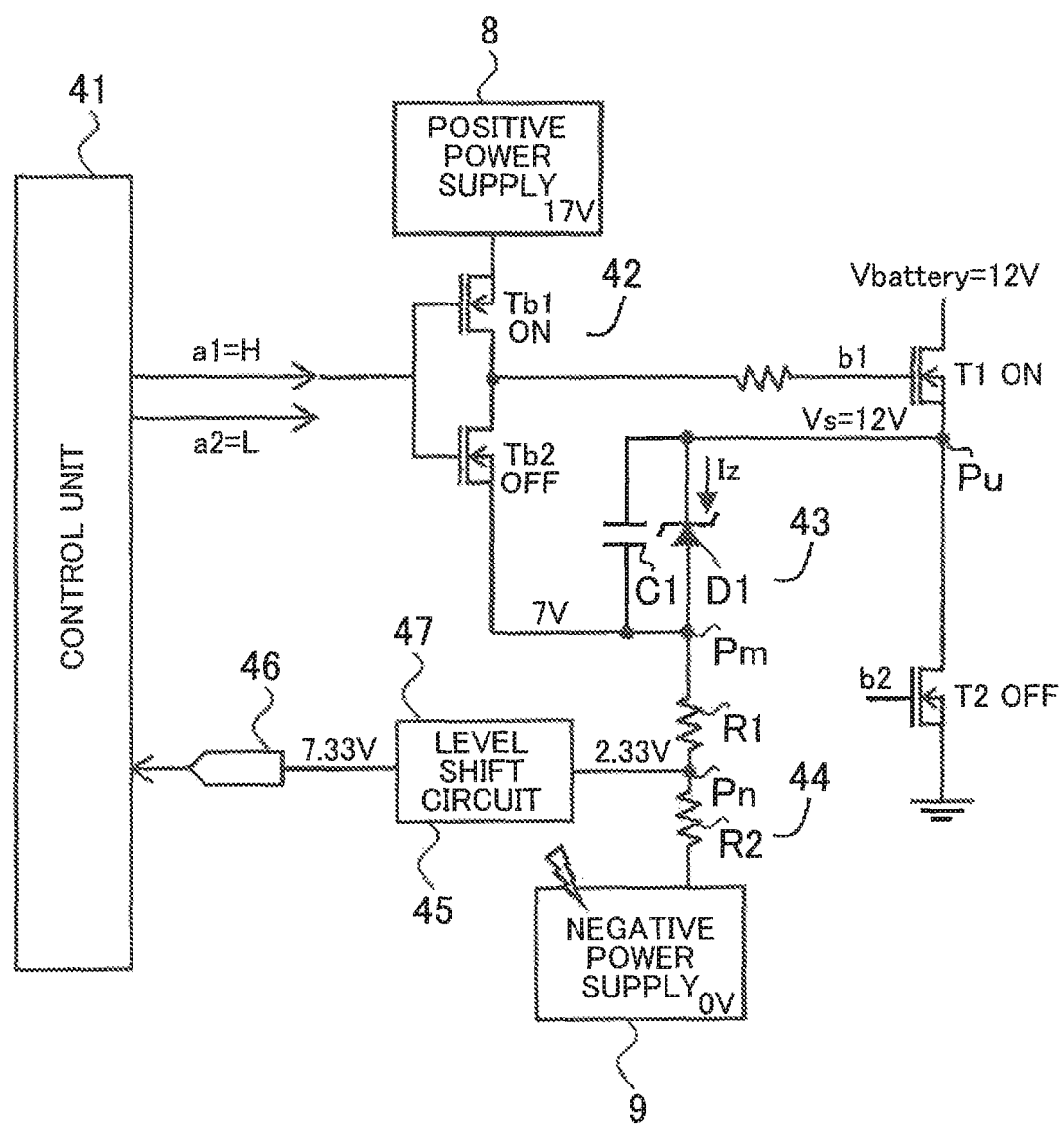
FIG. 7D is a diagram depicting another example of the state of the motor control apparatus during an abnormal operation.

FIG. 7D illustrates the state of abnormality of the negative power supply 9. In the example illustrated in FIG. 7D, the power supply voltage of the negative power supply 9 is 0 V, and the upper-arm switching element T1 is on, whereas the lower-arm switching element T2 is off. In this case, the voltage of the node Pm is lower than the voltage Vs of the node Pu, 12 V, by the value of the Zener voltage Vz=5 V and is thus 7 V. Consequently, the voltage of the node Pn resulting from the voltage division is approximately 2.33 V. The voltage output from the level shift circuit 47 is 7.33 V. This value falls out of the range of detected values obtained at the time of normality. Therefore, the control unit 41 may determine whether the negative power supply 9 is abnormal depending on whether or not the value of the voltage detected by the detection unit 45 falls within the range of detected values obtained at the time of normality.

As depicted in FIGS. 7A to 7D, during a normal operation, the voltage output from the detection unit 45 reflects the voltage Vs of the node Pu, which is an output terminal for a phase voltage. Thus, monitoring of the phase voltages is enabled. If the Zener diode D1 in the negative voltage circuit 43 fails, the voltage output from the detection unit 45 varies. The voltage output from the detection unit 45 also varies when the capacitor C1 fails. Thus, abnormality in the negative voltage circuit 43 can be detected. If the negative power supply 9 fails, the voltage output from the detection unit 45 varies. Thus, abnormality in the negative power supply 9 can be detected. Although not included in the above-described operation examples, a failure in one of the resistors R1, R2 in the voltage dividing circuit 44 varies the voltage output from the detection unit 45. Thus, abnormality in the voltage dividing circuit 44 can also be detected. Furthermore, as described in the examples, the voltage output from the detection unit 45 varies according to a failure portion. Consequently, when abnormality is detected, the failure portion can be determined based on the value of the voltage output from the detection unit 45.

The motor to which the motor control apparatus in the invention is directed is not limited to the three-phase brushless motor in the above-described examples. The invention is also applicable to motor control apparatuses configured to drive other types of electric motors, for example, brushless motors with more or less than three phases and motors with brushes.

The invention is applicable not only to the above-described column assist electric power steering system but also to other types of power steering systems such as pinion or rack assist electric power steering systems. The invention is also applicable to motor control apparatuses for systems other than the electric power steering systems.

What is claimed is:

1. A motor control apparatus comprising:
an inverter including an upper-arm switching element and a lower-arm switching element connected together in series between a positive electrode and a negative electrode of a DC power supply to supply a voltage of a node between the upper-arm switching element and the lower-arm switching element to a motor as a phase voltage;
a driver that controls and turns the upper-arm switching element on and off by applying a first voltage or a second voltage lower than the first voltage to the upper-arm switching element in accordance with a control signal;
a negative voltage circuit that is connected between the node between the upper-arm switching element and the lower-arm switching element and a negative power supply supplying a negative voltage lower than a ground voltage, and that supplies, based on the voltage of the node, a voltage lower than the voltage of the node to the driver as the second voltage;
a voltage dividing circuit arranged between the negative voltage circuit and the negative power supply to perform voltage division between the negative voltage circuit and the negative power supply; and
a detection unit that outputs a signal based on a voltage resulting from the voltage division by the voltage dividing circuit.

2. The motor control apparatus according to claim 1, further comprising:
an abnormality detection unit that detects abnormality in the negative voltage circuit or the negative power supply based on a signal output by the detection unit.

3. The motor control apparatus according to claim 1, further comprising:
a control unit that generates, using the signal output by the detection unit, a control signal that controls and turns the upper-arm switching element and the lower-arm switching element on and off to output the control signal to the driver.

4. The motor control apparatus according to claim 1, wherein
the negative voltage circuit includes a capacitor and a Zener diode that are connected together in parallel.

5. The motor control apparatus according to claim 1, wherein the upper-arm switching element is a normally-on transistor.

6. The motor control apparatus according to claim 1, wherein
the detection unit includes a level shift circuit that shifts a level of the voltage resulting from the voltage division by the voltage dividing circuit.

7. The motor control apparatus according to claim 1, wherein
the voltage dividing circuit includes a plurality of resistors connected together in series between the negative voltage circuit and the negative power supply.

8. A power steering system that applies a steering assist force to a steering mechanism for a vehicle, the power steering system comprising:
the motor control apparatus according to claim 1; and
a motor that is controlled by the motor control apparatus to apply the steering assist force to the steering mechanism.

* * * * *